Figure 1:
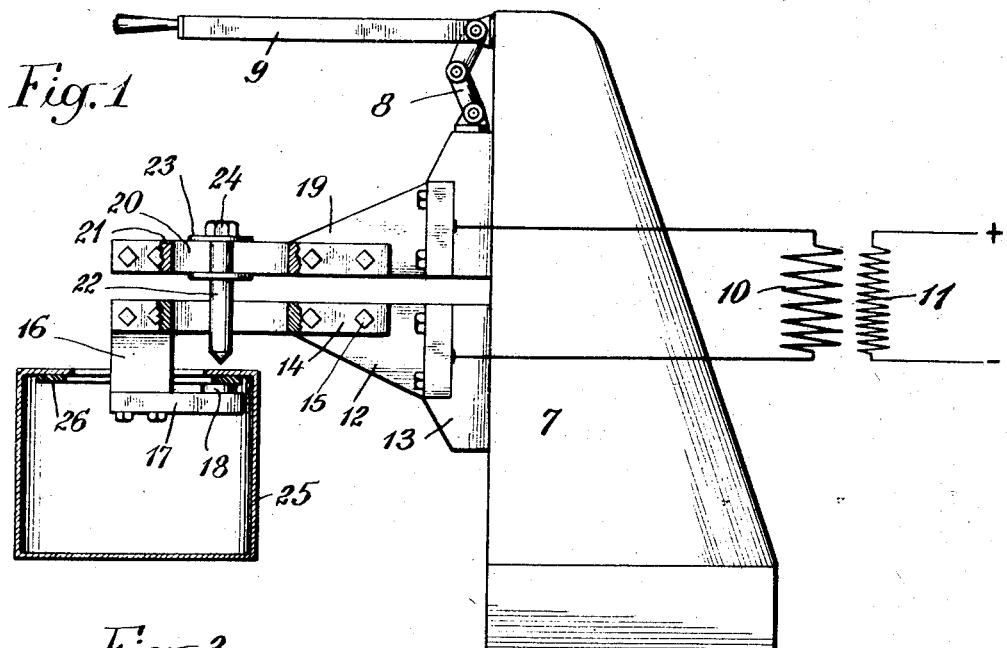

J. H. GRAVELL.
WELDING MACHINE.
APPLICATION FILED JAN. 17, 1913.

1,075,209.

Patented Oct. 7, 1913.

WITNESSES

INVENTOR
James H. Gravell
BY
Edmonds & Edmonds
ATTORNEYS

UNITED STATES PATENT OFFICE.

JAMES H. GRAVELL, OF PHILADELPHIA, PENNSYLVANIA, ASSIGNOR TO HALE AND KILBURN COMPANY, OF PHILADELPHIA, PENNSYLVANIA, A CORPORATION OF DELAWARE.

WELDING-MACHINE.

1,075,209.  Specification of Letters Patent.  Patented Oct. 7, 1913.

Application filed January 17, 1913. Serial No. 742,578.

*To all whom it may concern:*

Be it known that I, JAMES H. GRAVELL, a citizen of the United States, residing at Philadelphia, in the county of Philadelphia and State of Pennsylvania, have invented certain new and useful Improvements in Welding-Machines, of which the following is a specification.

This invention relates to welding machines and is directed to the provision of certain improvements in machines of this type, whereby the performance of certain classes of welding work is made more convenient and efficient, and whereby the range of utility of the machine is increased.

In electric welding machines, it is always important that the secondary circuit be made as short as possible, for the reason that resistance in the secondary circuit is a very important consideration. It frequently occurs that welding work is to be done upon articles of substantial size, such, for instance, as sheet-metal containers in the general form of tubs and barrels. On account of the size and shape of such devices, it has been necessary heretofore to provide welding machines with terminals of substantial length so that they would reach out from their support or from the secondary of the transformer so far that they might be made to engage the work at the proper points. As the terminals are so extended, the resistance of the secondary circuit is increased and the operation is rendered less efficient. In some cases the size and shape of the work are such that electric welding is not employed because it would be uneconomical, although on account of the nature of the work, the use of electric welding is highly desirable.

The present invention involves the provision of terminals or work-gripping members so shaped as to make the machine independent of the size and bulk of the articles to be welded thereon. This is accomplished by the provision of a work-gripping or current-carrying member which extends in one direction and is then bent backward upon itself to the point of engagement with the work. The opposite work-gripping or current-carrying member is arranged to coact with this backwardly extending portion, to grip the work between them and carry the current to and from the work. In this way it is possible to make a welding machine with a secondary circuit of such small length as to permit of economical operation and to employ it in making welds on articles of substantial size, the construction of the machine itself being independent of the size and bulk of the device to be operated on thereby. Also, in this way the machine is adapted for performing welding work which cannot be performed on welding machines of the character heretofore commonly employed having terminals which are substantially straight.

I have illustrated in the accompanying drawings the preferred embodiment of my invention, in which—

Figure 3:
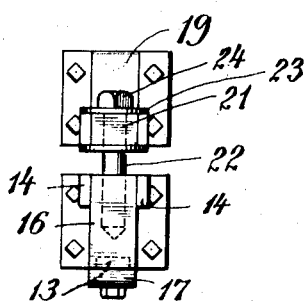
Figure 2:
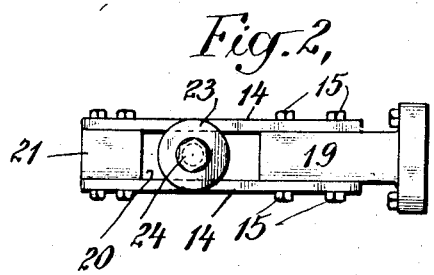
Figure 5:
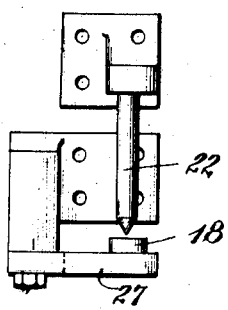
Figure 4:
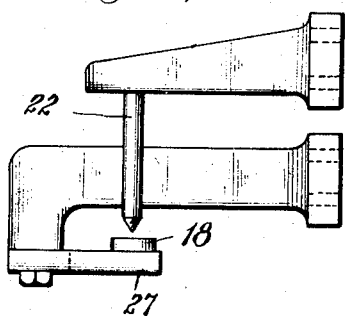
Figure 6:
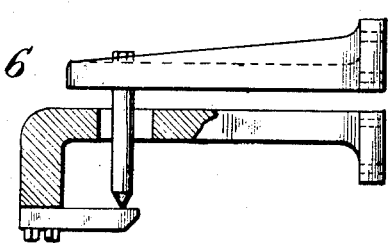

Figure 1 is a sectional elevation partly diagrammatic of a welding machine constructed in accordance with the invention, Fig. 2 is a top view of the terminals, Fig. 3 is an end view of the terminals, Figs. 4 and 5 are views corresponding to Figs. 2 and 3 and illustrating a slightly modified form of terminals, and Fig. 6 is a sectional elevation of a further modified form of terminals.

Referring first to Figs. 1, 2 and 3, a frame or support is shown at 7, this being diagrammatically illustrated and intended to indicate a support for the terminals of an electric welding machine constructed in any suitable manner. Upper and lower terminals are shown mounted upon the support 7, the upper terminal being vertically movable in any suitable manner, as by means of a toggle 8 and operating handle 9. The two terminals are connected in the secondary circuit of a transformer 10 whose primary is indicated at 11. The lower terminal includes a casting 12 of copper provided with flanges by means of which it is bolted to the body piece 13 of the terminal. To the casting 12 are secured two bars 14 of rolled copper, these being secured to the casting 12 by means of bolts 15. The outer ends of the bars 14 are similarly bolted together and to a copper bar 16 which lies between the bars 14 and extends downwardly therefrom. The lower end of the bar 16 has a copper piece 17 bolted thereto, and on the end of this piece an integral raised pad 18 is provided for coaction with the work. It will be seen that the terminal thus constructed is provided with a member 14 extending in one direction and connected to a member 17 which extends in the opposite direction to the point of engagement of the terminal with the work. It will also be noted that there is open space between the bars 14 beyond the casting 12. The upper terminal is made from a casting 19 similar to the casting 12, and bars 20 similar to the bars 14 are bolted to the casting and to a block 21 which lies between their outer ends. It will be noted that this construction of the upper terminal provides a slot extending lengthwise of the terminal between the bars 20. A member 22 is provided in this slot adapted to be secured to the bars 20 in any position lengthwise of this slot. This member 22 is here shown as a cylindrical copper rod pointed at its lower end and provided with washers 23 and a nut 24, whereby it may be secured to the bars 20 in any desired position along the length of the slot between them.

In Fig. 1, the work is shown as a metallic vessel, closed except for a circular opening in one end, and it is desired to secure a stiffening ring or reinforcement 26 to this vessel around the opening therein. To do this, the vessel 25 is raised so that the end of the lower terminal of the machine passes through the opening in the vessel and is then positioned so that the ring 26 bears upon the work-engaging pad 18 of the lower terminal and so that the edge of the vessel 25 about the opening therein bears upon the ring. The member 22 is secured to the upper terminal in such position that it will directly overlie the pad 18. Then, by lowering the upper electrode, the work will be gripped between the member 22 and the bar 17 of the lower terminal, whereupon the circuit may be closed and the welding current will flow through the parts. It will be seen that the lower terminal constructed as above described extends laterally away from the support 7 and then backwardly toward the support 7 and to the point of engagement of the lower terminal with the work. The upper terminal directly overlies the lower terminal and is provided with a work-engaging member projecting downwardly through an opening in the lower terminal. By reason of this arrangement of the parts, the construction of the machine is to a large extent independent of the shape and bulk of the device to be operated upon, as, for instance, the vessel 25.

It has been attempted heretofore to perform welding work of the character indicated in Fig. 1, using a welding machine having terminals which project laterally from the frame of the machine throughout their length. With such a machine the welds would be made on the side of the opening in the vessel away from the frame of the machine. In order to operate in this way, if the vessel be of large dimensions, the terminals of the machine must be made long and the resistance of the secondary circuit would be objectionably large. But with a machine constructed as shown in Fig. 1 so that the weld may be made on the side of the opening in the vessel toward the frame of the machine, the size of the vessel to be operated on has little or no effect upon the length required for the terminals of the machine.

In Figs. 4 and 5, a slight modification of the form of the terminals is shown. This differs from the construction shown in Figs. 1, 2 and 3, primarily, in that the member 22 on the upper terminal does not project through an opening in the lower terminal. Instead of this, the lower terminal has an offset therein, so that the member 22 may be displaced laterally from the portion of the lower terminal which is connected to the block 13. In Fig. 5, the lateral displacement of the main portion of the lower terminal from the member 22 is clearly shown, the bar 27 which corresponds to the bar 17 of Fig. 1 being of angular form so that the pad 18 thereon directly underlies the member 22. In Figs. 4 and 5, the member 22 is not shown as adjustable lengthwise of the upper terminal, as in many cases such adjustment would not be required. In Fig. 1, however, the member 22 is adjustable lengthwise of the upper terminal to move it to any desired position along the slot 20. When a change in the position of the member 22 is made, a corresponding change is made in the bar 17 which is selected and secured to the member 16 of the lower terminal.

In Fig. 6, a further modification of the invention is illustrated, this differing from the construction shown in Fig. 1 principally in that castings of copper are employed for the upper and lower terminals, instead of rolled bars.

In all of the constructions herein illustrated, it is the lower terminal which is provided with the backwardly directed portion rather than the upper terminal. This is considered preferable for the reason that it is the common practice to make the upper terminal the movable one. It will be understood, however, that the upper terminal could be provided with a backwardly extending portion, this being of such length that its end would project under the end of the lower terminal. Such a construction, however, would have the disadvantage that the work would be moved each time the movable terminal was moved, for the work would then be supported upon the backwardly directed end of the upper terminal which end would extend under the end of the lower terminal.

Having described my invention, what I claim as new therein and desire to secure by Letters Patent of the United States is:

1. A welding machine comprising a support, a pair of terminals mounted thereon between which the work is gripped and between which the current passes through the work, and means for moving one of said terminals bodily in a vertical direction upon said support, one of said terminals being so shaped that it extends laterally from the support and then backwardly toward the support, and the other terminal having a member thereon which coacts with the backwardly extending portion of the first-named terminal through the work, substantially as set forth.

2. A welding machine comprising a support, a pair of terminals mounted thereon between which the work is gripped and between which the current passes through the work, one of said terminals being so shaped that it extends laterally away from said support and then backwardly toward the support, and a member mounted on the other terminal, adjustable lengthwise thereof and extending in proximity to said backwardly extending portion of the first-named terminal, substantially as set forth.

3. A welding machine comprising a support, a pair of terminals mounted thereon between which the work is gripped and between which the current passes through the work, one of said terminals being so shaped that it extends laterally away from said support and then backwardly toward the support, and a member mounted on the other terminal and projecting through an opening in the portion of the first-named terminal extending from the support and in proximity to the backwardly extending portion thereof, substantially as set forth.

4. A welding machine comprising a support, a pair of terminals mounted thereon, a transformer whose secondary is connected to said terminals, and means for moving one of said terminals bodily in a vertical direction upon said support, one of said terminals being so shaped that the welding current flows therethrough in one direction away from said support and then in the opposite direction toward the support to the point of engagement of the terminal with the work and the other terminal being adapted to coact with the first-named terminal through the work at said point of engagement with the work, substantially as set forth.

5. A welding machine comprising a transformer, two terminals connected to the secondary of the transformer and adapted to grip the work between them, one of said terminals being so shaped that the welding current flows therethrough in one direction and then in the opposite direction to the point of engagement with the work, a member on the other terminal projecting through an opening in the first-named terminal and in proximity to the point of engagement thereof with the work, and means for moving said terminals toward and away from each other, substantially as set forth.

6. A welding machine comprising a support, a pair of terminals mounted thereon between which the work is gripped and between which the current passes through the work, one of said terminals being so shaped that it extends laterally away from said support and then backwardly toward the support, a member mounted on the other terminal and adjustable lengthwise thereof, said member projecting through an opening in the portion of the first-named terminal extending from the support and in proximity to the backwardly extending portion thereof, and means for moving said terminals toward and away from each other, substantially as set forth.

This specification signed and witnessed this 14th day of January, 1913.

JAMES H. GRAVELL.

Witnesses:
WM. J. EARNSHAW,
B. TUCKER.